United States Patent
Reese et al.

(10) Patent No.: US 11,119,631 B2
(45) Date of Patent: *Sep. 14, 2021

(54) GENERATING A PLAYLIST BASED ON CONTENT META DATA AND USER PARAMETERS

(71) Applicant: Leaf Group Ltd., Santa Monica, CA (US)

(72) Inventors: Byron William Reese, Georgetown, TX (US); Monica Winn Landers, Austin, TX (US); Brian Andrew Dillon, Austin, TX (US)

(73) Assignee: Leaf Group Ltd., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/231,809

(22) Filed: Dec. 24, 2018

(65) Prior Publication Data

US 2019/0129587 A1     May 2, 2019

Related U.S. Application Data

(63) Continuation of application No. 15/146,779, filed on May 4, 2016, now Pat. No. 10,162,486, which is a continuation of application No. 13/894,199, filed on May 14, 2013, now Pat. No. 9,389,754.

(51) Int. Cl.
| | |
|---|---|
| *G06F 3/0484* | (2013.01) |
| *G06F 3/0482* | (2013.01) |
| *G06F 3/14* | (2006.01) |

(52) U.S. Cl.
CPC ........ *G06F 3/0482* (2013.01); *G06F 3/04847* (2013.01); *G06F 3/14* (2013.01); *G06F 2203/04803* (2013.01)

(58) Field of Classification Search
CPC combination set(s) only.
See application file for complete search history.

(56) References Cited

U.S. PATENT DOCUMENTS

| | | |
|---|---|---|
| 6,757,691 B1 | 6/2004 | Welsh et al. |
| 7,080,138 B1 | 7/2006 | Baker et al. |
| 7,512,622 B2 | 3/2009 | Volk et al. |

(Continued)

FOREIGN PATENT DOCUMENTS

| | | |
|---|---|---|
| KR | 1020090034573 | 4/2009 |
| KR | 1020110043901 | 4/2011 |

(Continued)

OTHER PUBLICATIONS

International Patent Application Serial No. PCT/US2014/033466, International Preliminary Report on Patentability and Written Opinion, dated Aug. 18, 2014.

*Primary Examiner* — Hien L Duong
(74) *Attorney, Agent, or Firm* — Greenberg Traurig

(57) ABSTRACT

Systems and methods to generate a playlist based on content meta data. In one embodiment, a method includes: receiving user-defined parameters; generating a playlist comprising a plurality of content portions, the generating comprising selecting the plurality of content portions from a data repository based on the user-defined parameters and further based on meta data for content stored in the data repository; and providing the playlist for display on a user device.

17 Claims, 5 Drawing Sheets

(56) References Cited

U.S. PATENT DOCUMENTS

| | | | |
|---|---|---|---|
| RE42,683 E | 9/2011 | Marcus | |
| 8,200,775 B2 | 6/2012 | Moore | |
| 8,306,976 B2 | 11/2012 | Handman et al. | |
| 8,341,179 B2 | 12/2012 | Zeinfeld | |
| 8,391,455 B2 | 3/2013 | Kelkar et al. | |
| 8,417,581 B2 | 4/2013 | Ajjarapu et al. | |
| 8,568,277 B2 * | 10/2013 | Johnson | G06F 3/0481 482/9 |
| 8,818,898 B2 | 8/2014 | Schlossberg et al. | |
| 8,856,331 B2 | 10/2014 | Coyer et al. | |
| 9,326,032 B2 | 4/2016 | Molinelli et al. | |
| 9,389,754 B2 | 7/2016 | Reese et al. | |
| 9,613,659 B2 * | 4/2017 | Maser | A63B 24/0075 |
| 9,691,428 B2 | 6/2017 | Maser et al. | |
| 10,162,486 B2 | 12/2018 | Reese et al. | |
| 2002/0092019 A1 | 7/2002 | Marcus | |
| 2003/0164844 A1 | 9/2003 | Kravitz et al. | |
| 2003/0182308 A1 | 9/2003 | Ernst et al. | |
| 2004/0093327 A1 | 5/2004 | Anderson et al. | |
| 2004/0127335 A1 | 7/2004 | Watterson et al. | |
| 2004/0205593 A1 | 10/2004 | Kraemer | |
| 2005/0065847 A1 | 3/2005 | Feeley et al. | |
| 2005/0076061 A1 | 4/2005 | Cox | |
| 2005/0177358 A1 | 8/2005 | Melomed et al. | |
| 2005/0250458 A1 | 11/2005 | Graham et al. | |
| 2006/0229161 A1 | 10/2006 | Demas | |
| 2006/0265730 A1 | 11/2006 | Hays et al. | |
| 2007/0014422 A1 * | 1/2007 | Wesemann | H04H 60/04 381/119 |
| 2007/0074617 A1 | 4/2007 | Vergo | |
| 2007/0074619 A1 | 4/2007 | Vergo | |
| 2007/0100698 A1 | 5/2007 | Neiman et al. | |
| 2007/0136093 A1 * | 6/2007 | Rankin | G16H 10/20 705/2 |
| 2008/0005276 A1 | 1/2008 | Frederick | |
| 2008/0071929 A1 | 3/2008 | Motte et al. | |
| 2008/0086318 A1 * | 4/2008 | Gilley | G06Q 10/06 705/319 |
| 2008/0141134 A1 | 6/2008 | Miyazaki et al. | |
| 2008/0141135 A1 | 6/2008 | Mason et al. | |
| 2008/0168032 A1 | 7/2008 | Criou et al. | |
| 2009/0047644 A1 | 2/2009 | Mensah et al. | |
| 2009/0048939 A1 * | 2/2009 | Williams | G06Q 30/0641 705/27.1 |
| 2009/0075782 A1 | 3/2009 | Joubert et al. | |
| 2009/0083326 A1 | 3/2009 | Pelton | |
| 2009/0198580 A1 | 8/2009 | Broberg et al. | |
| 2009/0222392 A1 | 9/2009 | Martin et al. | |
| 2009/0240732 A1 | 9/2009 | Amidon et al. | |
| 2010/0005068 A1 | 1/2010 | Howard et al. | |
| 2010/0010865 A1 | 1/2010 | Dyer | |
| 2010/0023863 A1 | 1/2010 | Cohen-Martin | |
| 2010/0041419 A1 | 2/2010 | Svendsen et al. | |
| 2010/0049796 A1 | 2/2010 | Kawamura et al. | |
| 2010/0070523 A1 | 3/2010 | Delgo et al. | |
| 2010/0131527 A1 * | 5/2010 | Wohlert | G06F 16/4387 707/758 |
| 2010/0131844 A1 * | 5/2010 | Wohlert | G11B 27/034 715/716 |
| 2010/0131895 A1 * | 5/2010 | Wohlert | H04L 65/604 715/811 |
| 2010/0138443 A1 | 6/2010 | Ramakrishnan et al. | |
| 2010/0146144 A1 | 6/2010 | Audenaert et al. | |
| 2010/0153518 A1 | 6/2010 | Kitts | |
| 2010/0161354 A1 | 6/2010 | Lim et al. | |
| 2010/0205228 A1 | 8/2010 | Reese | |
| 2010/0273610 A1 * | 10/2010 | Johnson | G06F 3/0481 482/9 |
| 2010/0278425 A1 | 11/2010 | Takemoto et al. | |
| 2010/0306656 A1 | 12/2010 | Moloney et al. | |
| 2011/0055718 A1 | 3/2011 | Tanaka et al. | |
| 2011/0130852 A1 | 6/2011 | Thorn | |
| 2011/0161847 A1 | 6/2011 | Chaikin et al. | |
| 2011/0164042 A1 | 7/2011 | Chaudhri | |
| 2011/0191684 A1 | 8/2011 | Greenberg | |
| 2011/0225156 A1 | 9/2011 | Pavlik | |
| 2011/0231762 A1 | 9/2011 | Toida | |
| 2011/0264736 A1 | 10/2011 | Zuckerberg et al. | |
| 2011/0276372 A1 | 11/2011 | Spivack et al. | |
| 2011/0281249 A1 | 11/2011 | Gammell et al. | |
| 2011/0302145 A1 | 12/2011 | Brown et al. | |
| 2011/0319229 A1 * | 12/2011 | Corbalis | A63B 71/0622 482/9 |
| 2012/0030014 A1 | 2/2012 | Brunsman et al. | |
| 2012/0030015 A1 | 2/2012 | Brunsman et al. | |
| 2012/0040799 A1 | 2/2012 | Jaquish et al. | |
| 2012/0167010 A1 | 6/2012 | Campbell et al. | |
| 2012/0192253 A1 | 7/2012 | Betsch et al. | |
| 2012/0221687 A1 | 8/2012 | Hunter et al. | |
| 2012/0244995 A1 | 9/2012 | Dibenedetto et al. | |
| 2012/0254755 A1 | 10/2012 | Wohlert | |
| 2012/0272147 A1 | 10/2012 | Strober | |
| 2012/0272185 A1 | 10/2012 | Dodson et al. | |
| 2012/0309511 A1 * | 12/2012 | Chung | H04N 21/4781 463/30 |
| 2012/0322041 A1 | 12/2012 | Weisman | |
| 2013/0007617 A1 | 1/2013 | Mackenzie et al. | |
| 2013/0031450 A1 | 1/2013 | Reese | |
| 2013/0031465 A1 | 1/2013 | Yehaskel | |
| 2013/0031478 A1 | 1/2013 | Strober | |
| 2013/0036191 A1 | 2/2013 | Fink et al. | |
| 2013/0040271 A1 | 2/2013 | Rytky et al. | |
| 2013/0073534 A1 | 3/2013 | French | |
| 2013/0073957 A1 | 3/2013 | DiGiantomasso et al. | |
| 2013/0095458 A1 | 4/2013 | Cha et al. | |
| 2013/0160051 A1 | 6/2013 | Armstrong et al. | |
| 2013/0191749 A1 | 7/2013 | Coburn, IV et al. | |
| 2013/0244212 A1 * | 9/2013 | Giuliani | G16H 20/30 434/247 |
| 2013/0263023 A1 | 10/2013 | Goodwin et al. | |
| 2013/0316316 A1 | 11/2013 | Flavell et al. | |
| 2014/0067477 A1 | 3/2014 | Zhao | |
| 2014/0113768 A1 | 4/2014 | Lin et al. | |
| 2014/0135955 A1 | 5/2014 | Burroughs | |
| 2014/0141396 A1 | 5/2014 | Spratt | |
| 2014/0157171 A1 | 6/2014 | Brust et al. | |
| 2014/0270711 A1 * | 9/2014 | Maser | A63B 24/0075 386/290 |
| 2014/0272891 A1 | 9/2014 | Saladino et al. | |
| 2014/0313341 A1 | 10/2014 | Stribling | |
| 2014/0344693 A1 * | 11/2014 | Reese | G06F 3/0482 715/719 |
| 2016/0246463 A1 | 8/2016 | Reese et al. | |

FOREIGN PATENT DOCUMENTS

| | | |
|---|---|---|
| KR | 1020120115438 | 10/2012 |
| WO | 2010111964 | 10/2010 |

\* cited by examiner

GENERATING A PLAYLIST BASED ON CONTENT META DATA AND USER PARAMETERS

CROSS REFERENCE TO RELATED APPLICATIONS

This application is a continuation application of, and claims priority to, U.S. patent application Ser. No. 15/146,779, filed May 4, 2016, entitled "GENERATING A PLAYLIST BASED ON CONTENT META DATA AND USER PARAMETERS", which is a continuation application of, and claims priority to, U.S. patent application Ser. No. 13/894,199, filed May 14, 2013, entitled "GENERATING A PLAYLIST BASED ON CONTENT META DATA AND USER PARAMETERS" which issued Nov. 20, 2014, as U.S. Pat. No. 9,389,754, the entire contents of which application is incorporated by reference as if fully set forth herein.

FIELD OF THE TECHNOLOGY

At least some embodiments disclosed herein relate to selection and/or arrangement of content for presentation to a user. In one specific embodiment, the content is an exercise video playlist that a person can follow on a computing device (e.g., an Apple iPad device).

BACKGROUND

Exercise helps to maintain a healthy lifestyle. Many individuals want to participate in an exercise program. A successful exercise program is typically tailored to a fitness level of an individual and aimed at assisting the individual to achieve one or more specific fitness or exercise goals.

Sports trainers are available to assist individuals in developing exercise programs appropriate for their individual fitness levels and their specific fitness or exercise goals. Hiring such professionals, however, can be expensive. Furthermore, the busy schedules of many individuals make it difficult for these individuals to set aside time to meet with a fitness professional on a regular basis. Thus, many individuals fail to use the services of fitness professionals, and never achieve the benefits that can be obtained from an exercise program tailored, for example, to one's fitness level or areas of exercise interest.

SUMMARY OF THE DESCRIPTION

Systems and methods to select and/or arrange content for presentation to a user are described herein. Some embodiments are summarized in this section.

In one embodiment, a method implemented in a data processing system includes: receiving, by a computing device, user-defined parameters (e.g., type of exercise program and time length); generating, by the computing device, a playlist comprising a plurality of content portions (e.g., video clips), the generating comprising selecting the plurality of content portions from a data repository based on the user-defined parameters and further based on meta data for content (e.g., meta-tags associated with numerous different video clips) stored in the data repository; and providing, by the computing device, the playlist for display on a user device.

The disclosure includes methods and apparatuses which perform these methods, including data processing systems which perform these methods, and computer-readable media containing instructions which when executed on data processing systems cause the systems to perform these methods.

Other features will be apparent from the accompanying drawings and from the detailed description which follows.

BRIEF DESCRIPTION OF THE DRAWINGS

The embodiments are illustrated by way of example and not limitation in the figures of the accompanying drawings in which like references indicate similar elements.

DETAILED DESCRIPTION

Figure 1:
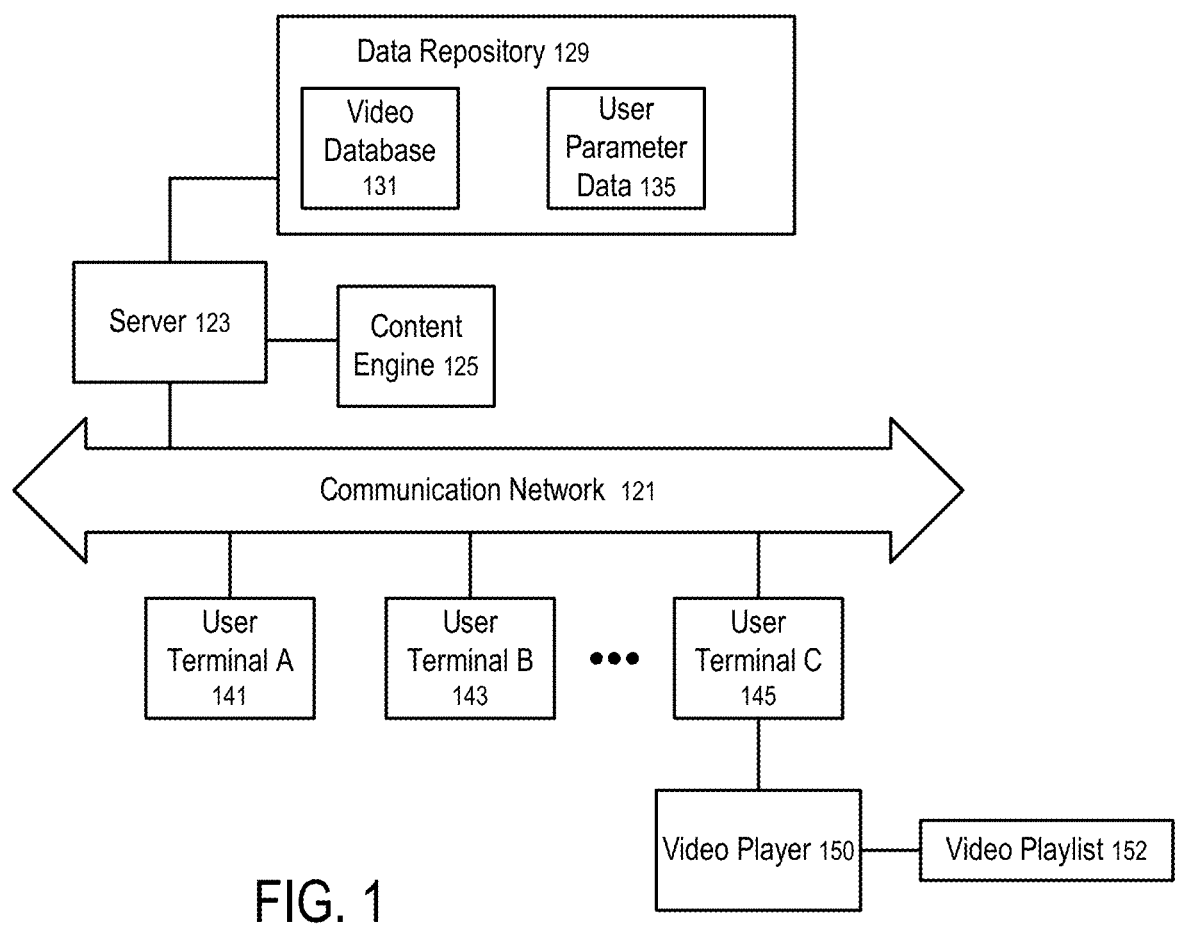
FIG. 1 shows a system for generating a video playlist according to one embodiment.

The following description and drawings are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

In one embodiment, a video playlist is generated using an fitness application executing on an iPad (an exemplary application is identified as "FitMix" herein merely for illustration). The fitness application dynamically generates a workout video based on user inputs. Within the application, a user defines parameters such as, for example, the desired time length of workout (e.g., total minutes), workout equipment that is desired for use or available to the user, and a preferred fitness instructor(s) (i.e., the instructor leading a given video clip).

In one embodiment, using software logic, the fitness application selects distinct exercise video clips (e.g., approximately 30-90 seconds each) from a video clip database and arranges the clips into a playlist. The playlist of video clips is then displayed to the user as a seamless, full-length workout video that complies with the user-defined parameters.

In one embodiment, the fitness application generates a wide variety and number of user-customized workout videos (e.g., many permutations of video clips may be generated).

Typically, the user will rarely see the same identical workout video again as each video will have some variation. A number of factors promote this high degree of variability: the use of user-defined parameters, the randomization of clip-selection and order, and the size of the clip database (note that new video clips can be continually added to the database). Also, the playlist of videos that is generated for a user can be saved and shared by that user with yet other users (e.g., members of an online social network site or other forms of sharing).

In one embodiment, a system to generate exercise videos (or other forms of content in alternative implementations) consists of a database that stores video clips with associated meta-tags, software logic that selects clips from the database and arranges them in an order for presentation/play to a user, and a video player that displays the playlist of clips as a seamless video to the user on a user device (e.g., iPad). The meta-tags are descriptors of key attributes of the individual video clips. In an exercise implementation, the meta-tags may include, for example, gender of the instructor, number of calories burned doing an exercise, muscle groups that are worked by an exercise, etc. The interface presented to the user of the application permits the user to specify values or ranges for these different attributes. For instance, using a graphical "slider," an end user may specify an upper and lower value for the number of calories that the user wants the playlist of videos to burn. For example, after a user has entered all of the user's preferences or requirements, all matching video clips are pulled from the database. If there are not enough matching videos to the user's requirements, the user is prompted to broaden the requirements. If there are more video clips than are needed, a secondary mechanism may be used to select which clips are chosen for the playlist. These secondary mechanism attributes may, for example, favor the most popular videos in the selection, the newest videos, or ones that the user has never seen before.

Additional features can be added to this system such as the ability to save and share workout videos. The system can support applications on a wide range of user devices (e.g., smart phones, tablets, PCs, and smart TVs).

FIG. 1 shows a system for generating a video playlist according to one embodiment. In FIG. 1, user terminals (e.g., 141, 143, . . . , 145) are used to access a server 123 over a communication network 121. The server 123 may include one or more web servers (or other types of data communication servers) to communicate with the user terminals (e.g., 141, 143, . . . , 145).

The server 123 is connected to a data repository 129 to store, for example, video clips in a video database 131 and user parameter data 135. Each user terminal may request that server 123 generate one or more video playlists. For example, user terminal 145 includes video player 150 that can be used to play video playlist 152. Video player 150 may be, for example, a software application downloaded from an online marketplace such as Apple iTunes or Google Play. Video player 150 may be incorporated as part of this downloaded application, and video playlist 152 may have been previously generated by and received from server 123. User terminal 145 may be, for example, an Apple iPad or a mobile device based on the Android operating system.

In one embodiment, as discussed in more detail below, a software application on user terminal 145 is used by a user to provide user parameter data 135 to server 123. Parameter data 135 includes parameters for a video playlist that the user desires to generate. Server 123 includes content engine 125, which uses user parameter data 135 and other software logic as discussed below to generate a video playlist using one or more video clips obtained from video database 131 (note that other data sources may be used instead of or in addition to data repository 129). The software logic may be contained within software of content engine 125. In one example, the video playlist is an exercise video that provides the user with a fitness workout or other exercise regimen. However, in other embodiments, the playlist may present videos or other content for activities other than exercise.

In one embodiment, video database 131 stores both video clips and meta data. Specifically, in this embodiment, the meta data consists of meta-tags associated with each of the video clips. The meta-tags can be basic (e.g., length, title, etc.) or application-specific (e.g., fitness instructor, workout equipment used, calories burned, body part exercised, intensity, etc.). For example, the video clips may be obtained from third party sources and/or from users such as fitness professionals that provide video clips for storage in video database 131. The meta-tags may have been previously associated with the video clips by the provider of the video clips, and/or the meta-tags may be associated by the operator of server 123.

Although FIG. 1 illustrates an example system implemented in client server architecture, embodiments of the disclosure can be implemented in various alternative architectures. For example, the server 123 can be implemented via a peer to peer network of user terminals, where the video playlists are shared via peer to peer communication connections. For example, content engines may be implemented in the individual user terminals, instead of running on one or more centralized servers.

In one alternative embodiment, the software application downloaded to user terminal 145 may be used to locally generate the video playlist using a video database stored on, or otherwise accessed locally by, user terminal 145. Server 123 is not involved in this local playlist generation. However, locally-generated playlist may still be sent to server 123 for storage and potential sharing with others such as social network friends of the user.

In some embodiments, a combination of client server architecture and peer to peer architecture can be used, in which one or more centralized servers may be used to provide some of the information and/or services and the peer to peer network is used to provide other information and/or services. Thus, embodiments of the disclosure are not limited to a particular architecture.

Figure 2:
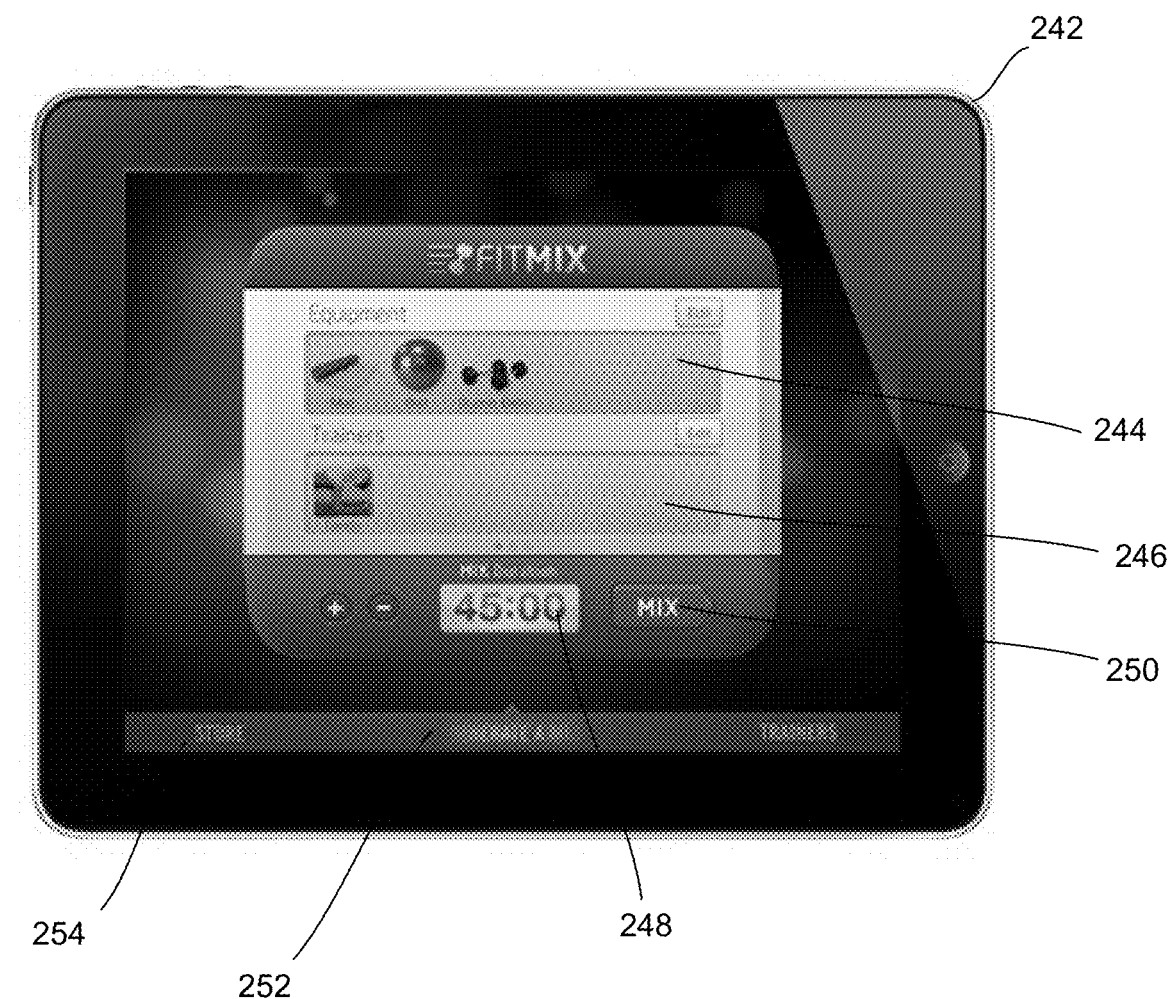
FIG. 2 shows a screen shot of a playlist generation application according to one embodiment.

FIG. 2 shows a screen shot displayed by a playlist generation application according to one embodiment. This playlist generation application is an example of the downloaded software application discussed above, and is downloaded to, for example, an iPad device 242. The playlist generation application may generate the playlist with or without interaction with server 123 as discussed above.

More specifically, a graphical user interface (GUI) of this application, as illustrated in FIG. 2, permits a user to choose parameters that will be used to dynamically generate, for example, workout video playlist 152. These parameters form part or all of the user parameter data 135 discussed above.

In FIG. 2, the user uses a window or region 244 of the displayed screen to manually select exercise equipment that the user desires for use during exercise. This equipment may be, for example, a mat, an exercise ball, and/or dumbbells. The user also uses a window or region 246 to specify one or more desired trainers to appear in some or all of the generated playlist 152. Also, the user specifies the desired total duration or time length of the new playlist using an entry field 248. The information provided in windows 244 and 246, along with entry field 248, form part of the user parameter data 135.

After the user has provided parameters for the desired video playlist, the user initiates the playlist generation process by touching, clicking, or otherwise activating a user icon 250. Alternatively, the user may activate a link 252 to generate the playlist. Link 254 provides the user access to an online store where the user may view, share, and/or purchase video playlists created by the user or other persons or entities.

Figure 3:
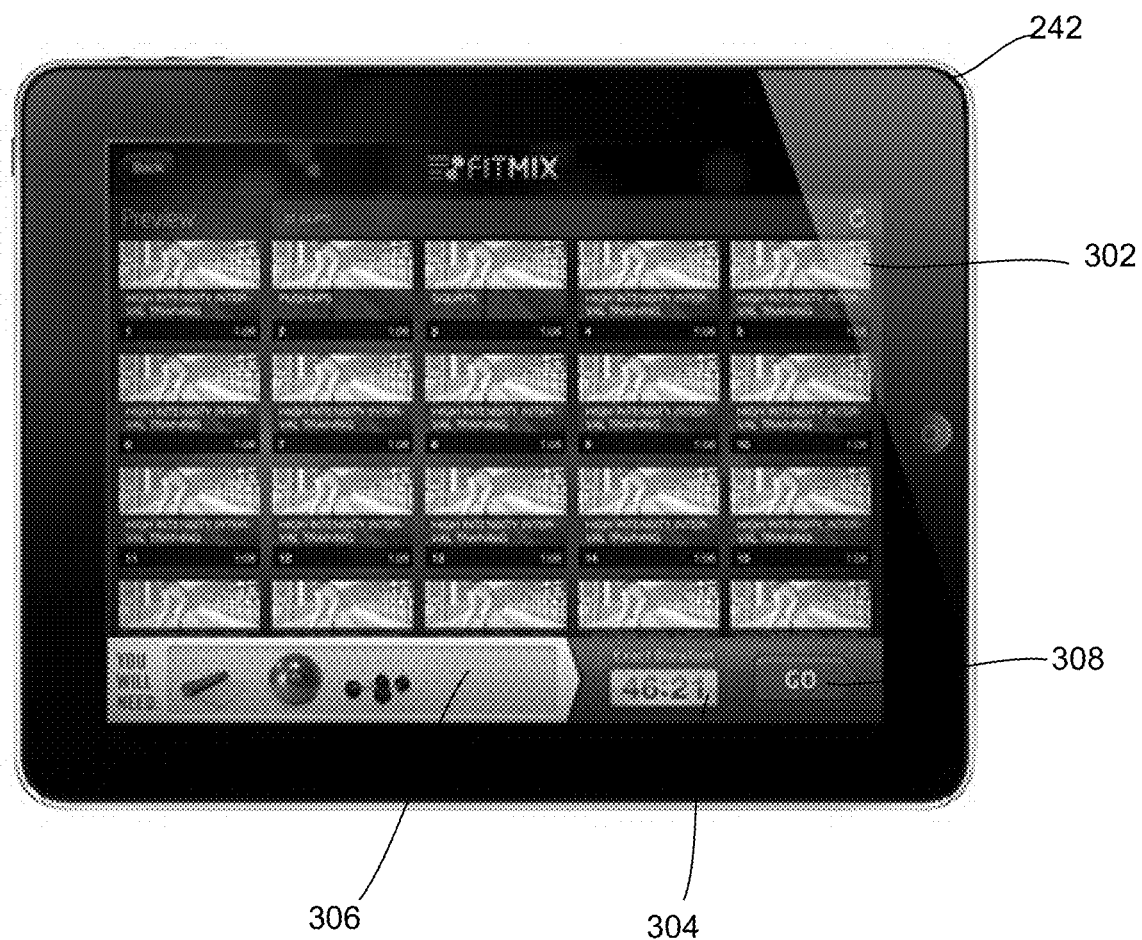
FIG. 3 shows a playlist generated using the generation application of FIG. 2 according to one embodiment.

FIG. 3 shows a playlist generated using the generation application of FIG. 2 according to one embodiment. The application (sometimes referred to herein simply as an "app") is used to arrange, for example, exercise video clips into a playlist. The video clips 302 selected for the generated playlist are presented to the user in a preview form on the screen of device 242. The exercise equipment needed by the user for use during the activities presented in video clips 302 is presented or displayed in a window region 306. The actual time duration of the generated playlist is presented in a field 304. The user may activate video player 150 using button 308.

After activation by the user, video player 150 displays the playlist of clips 302 generated by the software logic as a seamless video. The application may also display supplementary information, such as the remaining time, the exercise title, the upcoming exercise in the next video clip in sequence to be played, etc.

Figure 4:
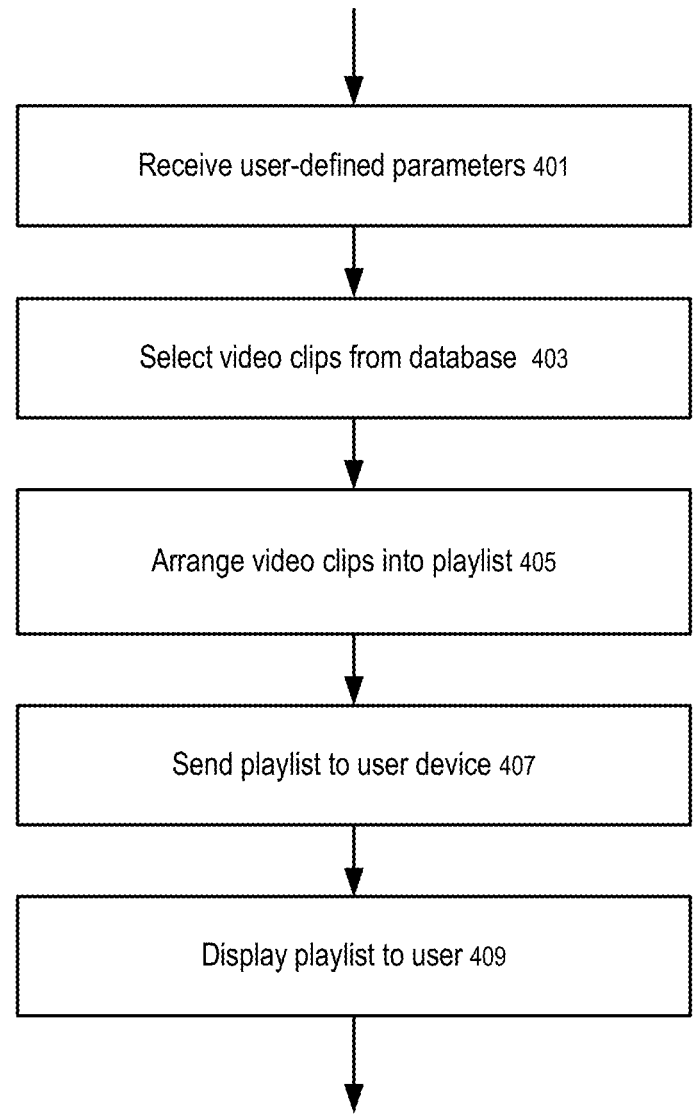
FIG. 4 shows a method to generate a playlist according to one embodiment.

FIG. 4 shows a method to generate a playlist according to one embodiment. As discussed above, software logic is used to generate the video playlist 152. The software logic may be contained in the downloaded software application and/or at server 123 in content engine 125. The method shown in FIG. 4 is implemented by this software logic.

More specifically, in block 401, user-defined parameters are received from a user via a user interface of a user terminal. These parameters may form some or all of user parameter data 135 to be transmitted to server 123, or such data may be used only for local processing.

In block 403, video clips are selected from a database based on the user-defined parameters, and further based on meta data for video clips stored in the database. This metadata may consist of or include the associated meta-tags discussed above.

In block 405, the selected video clips are arranged into a playlist for providing to the user. In block 407, if the playlist is generated at a server, the playlist is transmitted to a user terminal. In block 409, the generated playlist is displayed to the user on a display of a user terminal 145.

In one embodiment, the software logic that implements the method of FIG. 4 takes user-defined inputs as parameters, selects appropriate video clips from the database, and arranges the clips into an ordered playlist. The logic uses meta-tags stored in the database to filter, select, and arrange these video clips.

In this embodiment, three primary processes are implemented by the software logic, as discussed below. The first primary process implements a filter based on the user-defined parameters. More specifically, this process simply filters video database 131 to provide a filtered dataset that meets certain of the user-defined parameters. Only some of the user-defined parameters are considered in this filtering process. For example, in the software application downloaded to user device 242, parameters such as "fitness instructor" and "available exercise equipment" serve as filters in this process, whereas the parameter "desired playlist time duration" does not. Additional parameters used in this filtering may include, for example, "intensity", "level", etc.

The next two primary processes act on the filtered dataset obtained from the first primary process discussed immediately above. The second primary process implements a playlist structure and distribution of video clips. This second process determines the underlying structure of the playlist and considers the user-defined "time duration" parameter (e.g., as provided in entry field 248 of FIG. 2) along with the associated meta-tags for the video clips in database 131. The underlying structure of the playlist is defined by the percentage distribution of video clips from an arbitrary set of meta-tags. As one example, the arbitrary set in this context may mean the chosen set of attributes deemed appropriate for this application. For instance, in a context where the user picks courses for a meal to be prepared, and the application creates an integrated "how to" cooking video, the "arbitrary set" may include, for example, calories, difficulty in preparation, use of certain ingredients, etc.

As implemented using the playlist generation application, this second primary process evenly distributes exercise video clips into each of several groups in the generated video playlist, for example such as major muscle groups (e.g., clips having associated meta-tags: "upper-body", "lower-body", and "core"). Warm-up and warm-down periods may also be defined in this process. For example, the desired structure may be governed by the programming itself based on the domain of the application. For instance, in a workout application, there is a certain ordering that an expert will define that the user should do for a given set of workout steps. That ordering is programmed into the application. As another instance, the ordering might be a progression from easy to hard workout steps, or the ordering might rotate muscle groups. In the context of a cooking application, the ordering may be driven by how long each cooking step takes, etc.

In one embodiment, the final underlying structure is described in terms of percentage of total time (e.g., either a percentage of total desired time defined by the user, or a percentage of the actual total time of the generated playlist). One example of an underlying structure is as follows: 15% warm-up|20% upper-body|25% lower body|25% core|15% warm-down. In some cases, a broad definition of the meta playlist may be coded into the application so that, for example, the resulting video playlist is not dangerous, impossible, unreasonable, etc.

For each, for example, muscle group, video clips are drawn from the filtered dataset (from the first primary process above), and arranged randomly or pseudo-randomly, or otherwise arranged with some variability to avoid exact repetition. Additional software logic may be used to allow for reasonable repetition of video clips and to make more fine-tuned adjustments to the order of clips (e.g., based on one or more rules such as, for example, "clip B must always follow clip A").

A variety of underlying structures for playlists may be defined within the playlist generation application. For example, a playlist structure may gradually increase intensity throughout the workout, or evenly mix Pilates and yoga exercises. In some cases, the structure is broadly predetermined based on consultation with an expert, and the nuances and particulars are determined by the application based on the user's preferences.

The third primary process implements parameter-based limits (e.g., limits based on other of the user-defined parameters not used in the first primary process above). More specifically, certain user-defined parameters establish limits for the video clip playlist. The most dominant example is the "time duration" parameter (e.g., provided by the user in entry field 248 of FIG. 2). The final playlist is generated to be close to or identical to this "time duration" limit. In other cases, such as in a cooking example, there is no time duration. If the user picks a turkey, dressing, green beans, etc., that the user wants to eat at a certain time (e.g., 6:00 PM), then the playlist of videos has the user start earlier (e.g., at 3:45 PM) to ensure that the user completes the cooking on time. Meals for other users may require starting at an earlier or later time.

The software logic selects the appropriate clips from the filtered dataset (taking each clip's length and overall number of clips into account), and follows the underlying structure established in the second primary process above. Additional limits for the playlist generation application may be "calories burned" or "total repetitions".

In other embodiments, users may save and share generated workout videos (e.g., playlists of clips). On a backend server, this is implemented by saving and sharing a playlist data file. Any user who has access to an equivalent database of video clips is able to view the playlist data file as a workout video (an equivalent database contains all of the video clips referenced or included in the video list; some users may not have obtained or purchased all of the video clips found in a playlist of another user). A graphical user interface may be provided that permits users to modify existing, or create new, video clip playlists.

Various embodiments are now discussed below. In a first embodiment, a method comprises: receiving, via input to a mobile user device, user-defined parameters; generating, by a server, an exercise video playlist comprising a plurality of video clips, the generating comprising selecting the plurality of video clips from a data repository based on the user-defined parameters and further based on meta data for video content stored in the data repository; and sending, by the server, the playlist for display on the mobile user device.

In one embodiment, the playlist is displayed by a video player on a display of the user device. In one embodiment, the content stored in the data repository is video clips, and the meta data comprises associated meta-tags for each of the video clips.

In one embodiment, the generating the playlist comprises determining an underlying structure of the playlist, and arranging the video clips to be consistent with the underlying structure. In one embodiment, the playlist comprises links to the content portions. During playing of the playlist, the videos are accessed using the links.

Figure 5:
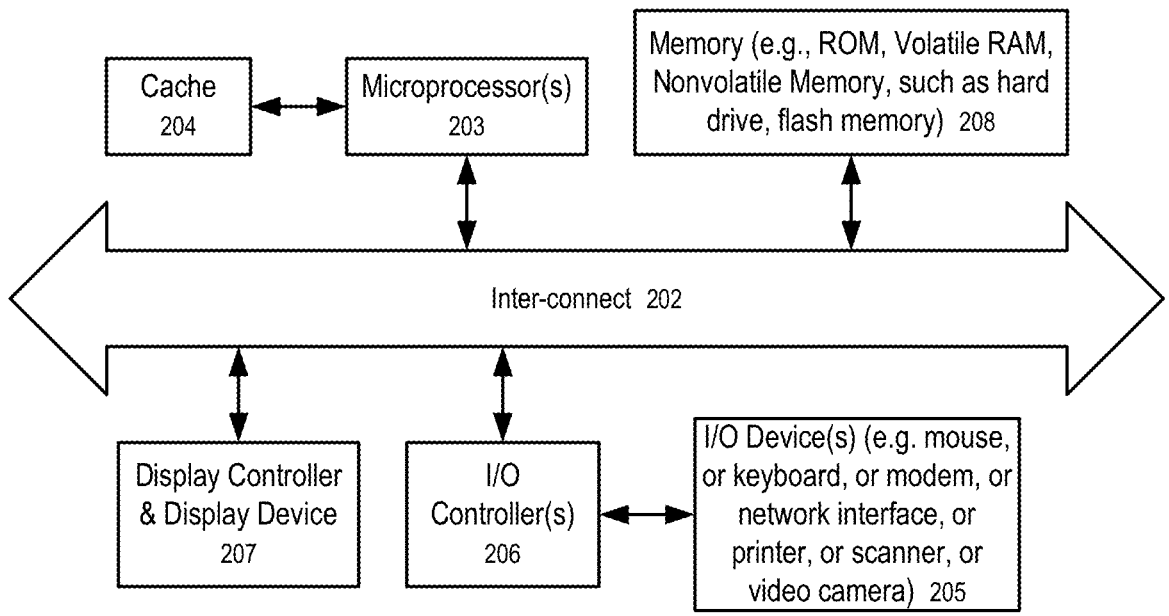
FIG. 5 shows a block diagram of a data processing system which can be used in various embodiments.

FIG. 5 shows a block diagram of a data processing system which can be used in various embodiments. While FIG. 5 illustrates various components of a computer system, it is not intended to represent any particular architecture or manner of interconnecting the components. Other systems that have fewer or more components may also be used.

In FIG. 5, the system 201 includes an inter-connect 202 (e.g., bus and system core logic), which interconnects a microprocessor(s) 203 and memory 208. The microprocessor 203 is coupled to cache memory 204 in the example of FIG. 5.

The inter-connect 202 interconnects the microprocessor(s) 203 and the memory 208 together and also interconnects them to a display controller and display device 207 and to peripheral devices such as input/output (I/O) devices 205 through an input/output controller(s) 206. Typical I/O devices include mice, keyboards, modems, network interfaces, printers, scanners, video cameras and other devices which are well known in the art.

The inter-connect 202 may include one or more buses connected to one another through various bridges, controllers and/or adapters. In one embodiment the I/O controller 206 includes a USB (Universal Serial Bus) adapter for controlling USB peripherals, and/or an IEEE-1394 bus adapter for controlling IEEE-1394 peripherals.

The memory 208 may include ROM (Read Only Memory), and volatile RAM (Random Access Memory) and non-volatile memory, such as hard drive, flash memory, etc.

Volatile RAM is typically implemented as dynamic RAM (DRAM) which requires power continually in order to refresh or maintain the data in the memory. Non-volatile memory is typically a magnetic hard drive, a magnetic optical drive, or an optical drive (e.g., a DVD RAM), or other type of memory system which maintains data even after power is removed from the system. The non-volatile memory may also be a random access memory.

The non-volatile memory can be a local device coupled directly to the rest of the components in the data processing system. A non-volatile memory that is remote from the system, such as a network storage device coupled to the data processing system through a network interface such as a modem or Ethernet interface, can also be used.

In one embodiment, a data processing system as illustrated in FIG. 5 is used to implement server 123, and/or an online network site, and/or other servers, such as a server to store and share video playlists for sharing.

In one embodiment, a data processing system as illustrated in FIG. 5 is used to implement a user terminal. A user terminal may be in the form of a personal digital assistant (PDA), a smart phone, a tablet computer, a cellular phone, a notebook computer or a personal desktop computer.

In some embodiments, one or more servers of the system can be replaced with the service of a peer to peer network of a plurality of data processing systems, or a network of distributed computing systems. The peer to peer network, or a distributed computing system, can be collectively viewed as a server data processing system.

Embodiments of the disclosure can be implemented via the microprocessor(s) 203 and/or the memory 208. For example, the functionalities described can be partially implemented via hardware logic in the microprocessor(s) 203 and partially using the instructions stored in the memory 208. Some embodiments are implemented using the microprocessor(s) 203 without additional instructions stored in the memory 208. Some embodiments are implemented using the instructions stored in the memory 208 for execution by one or more general purpose microprocessor(s) 203. Thus, the disclosure is not limited to a specific configuration of hardware and/or software.

Additional exemplary networked and distributed environments, and an exemplary computing device, are described in United States Patent Application Publication US 2009/0092124, published Apr. 9, 2009 (titled "NETWORK ROUTING OF ENDPOINTS TO CONTENT BASED ON CONTENT SWARMS"; inventors Singhal et al.; assignee Microsoft Corporation; application Ser. No. 11/866,811, filed Oct. 3, 2007), which is hereby incorporated by reference in its entirety.

Figure 6:
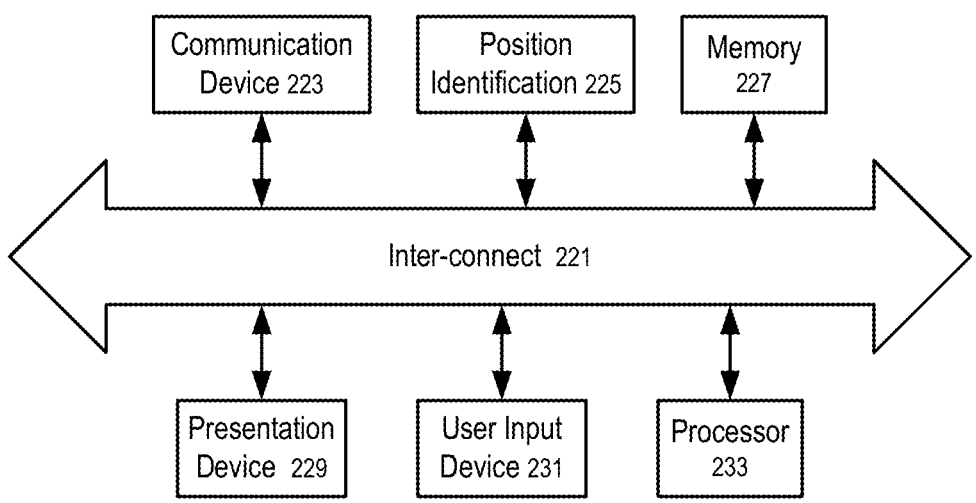
FIG. 6 shows a block diagram of a user device according to one embodiment.

FIG. 6 shows a block diagram of a user device according to one embodiment. In FIG. 6, the user device includes an inter-connect 221 connecting the presentation device 229, user input device 231, a processor 233, a memory 227, a position identification unit 225 and a communication device 223.

In FIG. 6, the position identification unit 225 is used to identify a geographic location for user content created for sharing. The position identification unit 225 may include a satellite positioning system receiver, such as a Global Positioning System (GPS) receiver, to automatically identify the current position of the user device.

In FIG. 6, the communication device 223 is configured to communicate with an online social network to provide user data. The user input device 231 may include a text input device, a still image camera, a video camera, and/or a sound recorder, etc.

In one embodiment, the user input device 231 and the position identification unit 225 are configured to automatically tag user data content created by the user input device 231 with navigation information identified by the position identification unit 225.

In this description, various functions and operations may be described as being performed by or caused by software code to simplify description. However, those skilled in the art will recognize what is meant by such expressions is that the functions result from execution of the code by a processor, such as a microprocessor. Alternatively, or in combination, the functions and operations can be implemented using special purpose circuitry, with or without software instructions, such as using an Application-Specific Integrated Circuit (ASIC) or a Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

While some embodiments can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

Routines executed to implement the embodiments may be implemented as part of an operating system, middleware, service delivery platform, SDK (Software Development Kit) component, web services, or other specific application, component, program, object, module or sequence of instructions referred to as "computer programs." Invocation interfaces to these routines can be exposed to a software development community as an API (Application Programming Interface). The computer programs typically comprise one or more instructions set at various times in various memory and storage devices in a computer, and that, when read and executed by one or more processors in a computer, cause the computer to perform operations necessary to execute elements involving the various aspects.

A machine readable medium can be used to store software and data which when executed by a data processing system causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine readable medium in entirety at a particular instance of time.

Examples of computer-readable media include but are not limited to recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROMS), Digital Versatile Disks (DVDs), etc.), among others. The computer-readable media may store the instructions.

The instructions may also be embodied in digital and analog communication links for electrical, optical, acoustical or other forms of propagated signals, such as carrier waves, infrared signals, digital signals, etc. However, propagated signals, such as carrier waves, infrared signals, digital signals, etc. are not tangible machine readable medium and are not configured to store instructions.

In general, a tangible machine readable medium includes any mechanism that provides (e.g., stores) information in a form accessible by a machine (e.g., a computer, network device, personal digital assistant, manufacturing tool, any device with a set of one or more processors, etc.).

In various embodiments, hardwired circuitry may be used in combination with software instructions to implement the techniques. Thus, the techniques are neither limited to any specific combination of hardware circuitry and software nor to any particular source for the instructions executed by the data processing system.

Methods and products for building a workout are described in U.S. Patent Application Publication No. US 2012/0244995, published Sep. 27, 2012 (titled "Methods and Program Products for Building a Workout"), which is hereby incorporated by reference in its entirety.

Systems and methods for generating and modifying a playlist are described in U.S. Pat. No. 8,306,976, issued Nov. 6, 2012 (titled "Methods and systems for utilizing contextual feedback to generate and modify playlists"; assignee Pandora Media, Inc.), which is hereby incorporated by reference in its entirety.

Media programming creation and the maintaining of a database of information about media elements and selecting from these when media programming is requested are described in U.S. Pat. No. Re. 42,683, reissued Sep. 6, 2011 (titled "System for automated generation of media"), which is hereby incorporated by reference in its entirety.

An episode presentation system for providing education and entertainment for children, having a station presenting the episode through audio and video outputs by playing set of media segments, where the episode is customized for a child, is described in U.S. Patent Application Publication No. US2012/0322041, published Dec. 20, 2012 (titled "METHOD AND APPARATUS FOR PRODUCING AND DELIVERING CUSTOMIZED EDUCATION AND ENTERTAINMENT"), which is hereby incorporated by reference in its entirety.

Methods and systems for providing learning as a service in a learning network are described in U.S. Pat. No. 8,417,581, issued Apr. 9, 2013 (titled "Method, system, and medium for enabling a user to access learning content via a single-window learner interface"), which is hereby incorporated by reference in its entirety.

Although some of the drawings illustrate a number of operations in a particular order, operations which are not order dependent may be reordered and other operations may be combined or broken out. While some reordering or other groupings are specifically mentioned, others will be apparent to those of ordinary skill in the art and so do not present an exhaustive list of alternatives. Moreover, it should be recognized that the stages could be implemented in hardware, firmware, software or any combination thereof.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A method, comprising:
   receiving, by a computing device, user-defined parameters, the user-defined parameters received from a user for a playlist to be generated, the user-defined parameters including available equipment items and a time duration parameter specifying a total time for the playlist, and the playlist to comprise a plurality of content portions;
   generating, by the computing device, the playlist, the generating comprising selecting and automatically arranging the plurality of content portions from a data repository based on the user-defined parameters and further based on meta data for content stored in the data repository; and
   providing a preview form of the plurality of content portions, for display in a first window region to the user on a user device, and further providing, for display in a second window region adjacent to the preview form, first equipment needed for use in performing activities associated with the plurality of content portions of the preview form.

2. The method of claim 1, further comprising defining an order of activity, wherein the generated playlist is further based on the order of activity.

3. The method of claim 1, further comprising providing an actual time duration of the playlist, for display on the user device, wherein the actual time duration is different from a total time specified by the time duration parameter.

4. The method of claim 1, wherein the user-defined parameters further include respective time percentages for each of a plurality of types of activity.

5. The method of claim 4, wherein the types of activity correspond to muscle groups.

6. The method of claim 1, further comprising providing an actual time duration of the playlist for display with the preview form.

7. A system, comprising:
   at least one processor; and
   memory storing instructions configured to instruct the at least one processor to:
      receive user-defined parameters from a user for a playlist to be generated, the playlist to comprise a plurality of content portions, the user-defined parameters including available equipment items, and further including respective time percentages desired for each of a plurality of types of activity;
      generate the playlist, the generating comprising selecting and automatically arranging the plurality of content portions from a data repository based on the user-defined parameters; and
      provide a preview form of the plurality of content portions, for display in a first window region on a user device, and further provide, for display in a second window region adjacent to the preview form, first equipment for use in performing activities associated with the plurality of content portions of the preview.

8. The system of claim 7, wherein the providing the preview form comprises sending data regarding the preview form from a server to the user device.

9. The system of claim 7, wherein the selecting is further based on meta data for content stored in the data repository, the meta data comprising a meta-tag for each of a plurality of video clips.

10. The system of claim 7, wherein the user-defined parameters further include a time duration parameter specifying a total time for the playlist.

11. The system of claim 10, wherein the instructions are further configured to instruct the at least one processor to provide an actual time duration of the generated playlist, for display on the user device, wherein the actual time duration is different from a total time specified by the time duration parameter.

12. A non-transitory computer-readable storage medium storing computer-readable instructions, which when executed, cause a computing system to:
   receive, by at least one processor, user-defined parameters, the user-defined parameters received from a user for a playlist to be generated, the user-defined parameters including available equipment items and a time duration parameter specifying a total time for the playlist, and the playlist to comprise a plurality of content portions;
   generate the playlist, the generating comprising randomly selecting and automatically arranging the plurality of content portions from a data repository based on the user-defined parameters and further based on meta data for content stored in the data repository; and
   provide a preview form of the plurality of content portions, for display in a first window region on a user device, and further provide, for display in a second window region adjacent to the preview form, first equipment needed for use in performing activities associated with the plurality of content portions of the preview form.

13. The non-transitory computer-readable storage medium of claim 12, further comprising providing an actual time duration of the playlist for display with the preview form.

14. The non-transitory computer-readable storage medium of claim 12, wherein the playlist is sent for viewing on a display of the user device.

15. The non-transitory computer-readable storage medium of claim 12, wherein each of the plurality of content portions is a video.

16. The non-transitory computer-readable storage medium of claim 12, wherein the playlist comprises links to the content portions.

17. The non-transitory computer-readable storage medium of claim 12, wherein the activation input is provided by the user in a user interface of the user device.

\* \* \* \* \*